(12) United States Patent
Churchill

(10) Patent No.: US 6,378,699 B1
(45) Date of Patent: Apr. 30, 2002

(54) ICE FISHING IMPLEMENT CADDY

(76) Inventor: Byron B. Churchill, 5619 33rd St. NW., Maple Lake, MN (US) 55358

( * ) Notice: Subject to any disclaimer, the term of this patent is extended or adjusted under 35 U.S.C. 154(b) by 0 days.

(21) Appl. No.: 09/775,442

(22) Filed: Feb. 2, 2001

(51) Int. Cl.⁷ .............................................. B65D 85/00
(52) U.S. Cl. ................... 206/315.11; 43/21.2; 206/561; 211/70.8; 220/553
(58) Field of Search ........................... 206/315.11, 223, 206/349, 372, 443, 486, 561–563; 43/21.2, 54.1, 57.1; 211/70.1, 70.8; 220/475, 516, 552–555

(56) References Cited

U.S. PATENT DOCUMENTS

| | | | |
|---|---|---|---|
| 2,590,154 A | | 3/1952 | Burns |
| 4,311,262 A | * | 1/1982 | Morin .......................... 206/443 |
| 4,460,085 A | | 7/1984 | Jantzen |
| 4,667,822 A | | 5/1987 | Coopmans |
| 5,207,321 A | * | 5/1993 | Jones .......................... 220/553 |
| 5,294,163 A | | 3/1994 | Lang |
| D351,498 S | | 10/1994 | Stebbins |
| 5,544,744 A | * | 8/1996 | Oman .......................... 220/555 |
| 5,593,061 A | * | 1/1997 | Prochnow ............... 206/315.11 |
| D378,456 S | | 3/1997 | Speicher |
| 5,893,572 A | | 4/1999 | Parks |
| 6,047,491 A | * | 4/2000 | De Busk ................. 206/315.11 |

* cited by examiner

Primary Examiner—Luan K. Bui

(57) ABSTRACT

A ice fishing implement caddy for holding a plurality of ice fishing implements. The ice fishing implement caddy includes a frame having a bottom wall, a first end wall, a second end wall and a top wall. The top wall has a plurality of openings extending therethrough. A slot extends through the top wall and is positioned generally adjacent to the first end wall. The frame has a height generally between 14 inches and 18 inches. A dividing wall is attached to and extends upwardly from the bottom wall. The dividing wall is attached to the second end wall and extends toward the first end wall. Each of a plurality of intermediate walls traverses the bottom wall and extends between a first side edge and a second edge of the bottom wall such that compartments are defined between adjacent intermediate walls. A portion of the intermediate walls extend through the dividing wall such that compartments are defined within said frame. Each of a pair of lips is coupled to and extends along one of the first and second side edges of the bottom wall. Each of the lips extends upwardly.

7 Claims, 3 Drawing Sheets

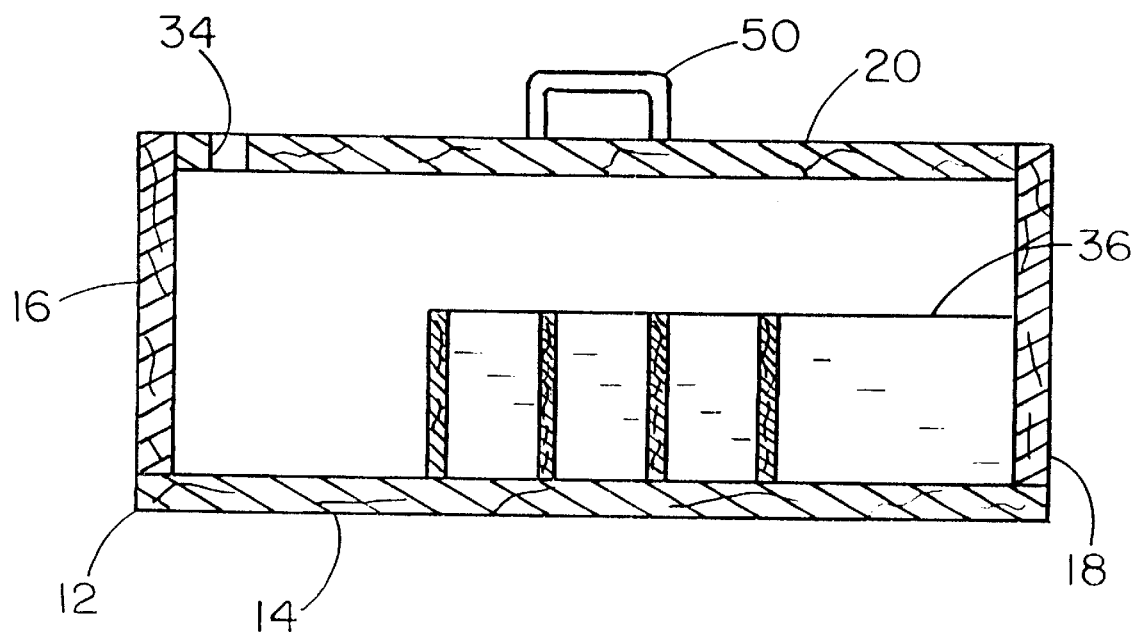
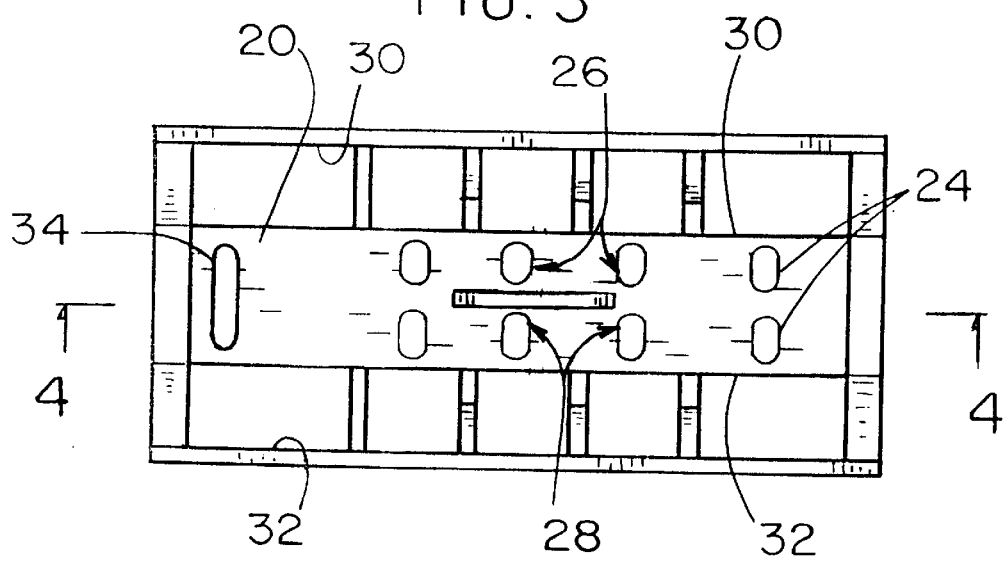

ICE FISHING IMPLEMENT CADDY

BACKGROUND OF THE INVENTION

1. Field of the Invention

The present invention relates to fishing caddies and more particularly pertains to a new ice fishing implement caddy for holding a plurality of ice fishing implements.

2. Description of the Prior Art

The use of fishing caddies is known in the prior art. More specifically, fishing caddies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Des. Pat. No. 351,498; U.S. Des. Pat. No. 378,456; U.S. Pat. Nos. 5,294,163; 5,893,572; 4,667,822; 4,460,085; and 2,590,154.

While these devices fulfill their respective, particular objectives and requirements, the aforementioned patents do not disclose a new ice fishing implement caddy. The inventive device includes a frame having a bottom wall, a first end wall, a second end wall and a top wall. The top wall has a plurality of openings extending therethrough. A slot extends through the top wall and is positioned generally adjacent to the first end wall. The frame has a height generally between 14 inches and 18 inches. A dividing wall is attached to and extends upwardly from the bottom wall. The dividing wall is attached to the second end wall and extends toward the first end wall. Each of a plurality of intermediate walls traverses the bottom wall and extends between a first side edge and a second edge of the bottom wall such that compartments are defined between adjacent intermediate walls. A portion of the intermediate walls extends through the dividing wall such that compartments are defined within said frame. Each of a pair of lips is coupled to and extends along one of the first and second side edges of the bottom wall. Each of the lips extends upwardly.

In these respects, the ice fishing implement caddy according to the present invention substantially departs from the conventional concepts and designs of the prior art, and in so doing provides an apparatus primarily developed for the purpose of holding a plurality of ice fishing implements.

SUMMARY OF THE INVENTION

In view of the foregoing disadvantages inherent in the known types of fishing caddies now present in the prior art, the present invention provides a new ice fishing implement caddy construction wherein the same can be utilized for holding a plurality of ice fishing implements.

The general purpose of the present invention, which will be described subsequently in greater detail, is to provide a new ice fishing implement caddy apparatus and method which has many of the advantages of the fishing caddies mentioned heretofore and many novel features that result in a new ice fishing implement caddy which is not anticipated, rendered obvious, suggested, or even implied by any of the prior art fishing caddies, either alone or in any combination thereof.

To attain this, the present invention generally comprises a frame having a bottom wall, a first end wall, a second end wall and a top wall. The top wall has a plurality of openings extending therethrough. A slot extends through the top wall and is positioned generally adjacent to the first end wall. The frame has a height generally between 14 inches and 18 inches. A dividing wall is attached to and extends upwardly from the bottom wall. The dividing wall is attached to the second end wall and extends toward the first end wall. Each of a plurality of intermediate walls traverses the bottom wall and extends between a first side edge and a second edge of the bottom wall such that compartments are defined between adjacent intermediate walls. A portion of the intermediate walls extend through the dividing wall such that compartments are defined within said frame. Each of a pair of lips is coupled to and extends along one of the first and second side edges of the bottom wall. Each of the lips extends upwardly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ice fishing implement caddy apparatus and method which has many of the advantages of the fishing caddies mentioned heretofore and many novel features that result in a new ice fishing implement caddy which is not anticipated, rendered obvious, suggested, or even implied by any of the prior art fishing caddies, either alone or in any combination thereof.

It is another object of the present invention to provide a new ice fishing implement caddy which may be easily and efficiently manufactured and marketed.

It is a further object of the present invention to provide a new ice fishing implement caddy which is of a durable and reliable construction.

An even further object of the present invention is to provide a new ice fishing implement caddy which is susceptible of a low cost of manufacture with regard to both materials and labor, and which accordingly is then susceptible of low prices of sale to the consuming public, thereby making such ice fishing implement caddy economically available to the buying public.

Still yet another object of the present invention is to provide a new ice fishing implement caddy which provides in the apparatuses and methods of the prior art some of the advantages thereof, while simultaneously overcoming some of the disadvantages normally associated therewith.

Still another object of the present invention is to provide a new ice fishing implement caddy for holding a plurality of ice fishing implements.

Yet another object of the present invention is to provide a new ice fishing implement caddy which includes a frame having a bottom wall, a first end wall, a second end wall and a top wall. The top wall has a plurality of openings extending therethrough. A slot extends through the top wall and is positioned generally adjacent to the first end wall. The frame has a height generally between 14 inches and 18 inches. A dividing wall is attached to and extends upwardly from the bottom wall. The dividing wall is attached to the second end wall and extends toward the first end wall. Each of a plurality of intermediate walls traverses the bottom wall and extends between a first side edge and a second edge of the bottom wall such that compartments are defined between adjacent intermediate walls. A portion of the intermediate walls extend through the dividing wall such that compartments are defined within said frame. Each of a pair of lips is coupled to and extends along one of the first and second side edges of the bottom wall. Each of the lips extends upwardly.

Still yet another object of the present invention is to provide a new ice fishing implement caddy that is adapted for holding a plurality of jigging rods and other items in an organized manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic plan view of the present invention.

FIG. 4 is a schematic cross-sectional view taken along line 4—4 of the FIG. 1 of the present invention.

DESCRIPTION OF THE PREFERRED EMBODIMENT

Figure 1:
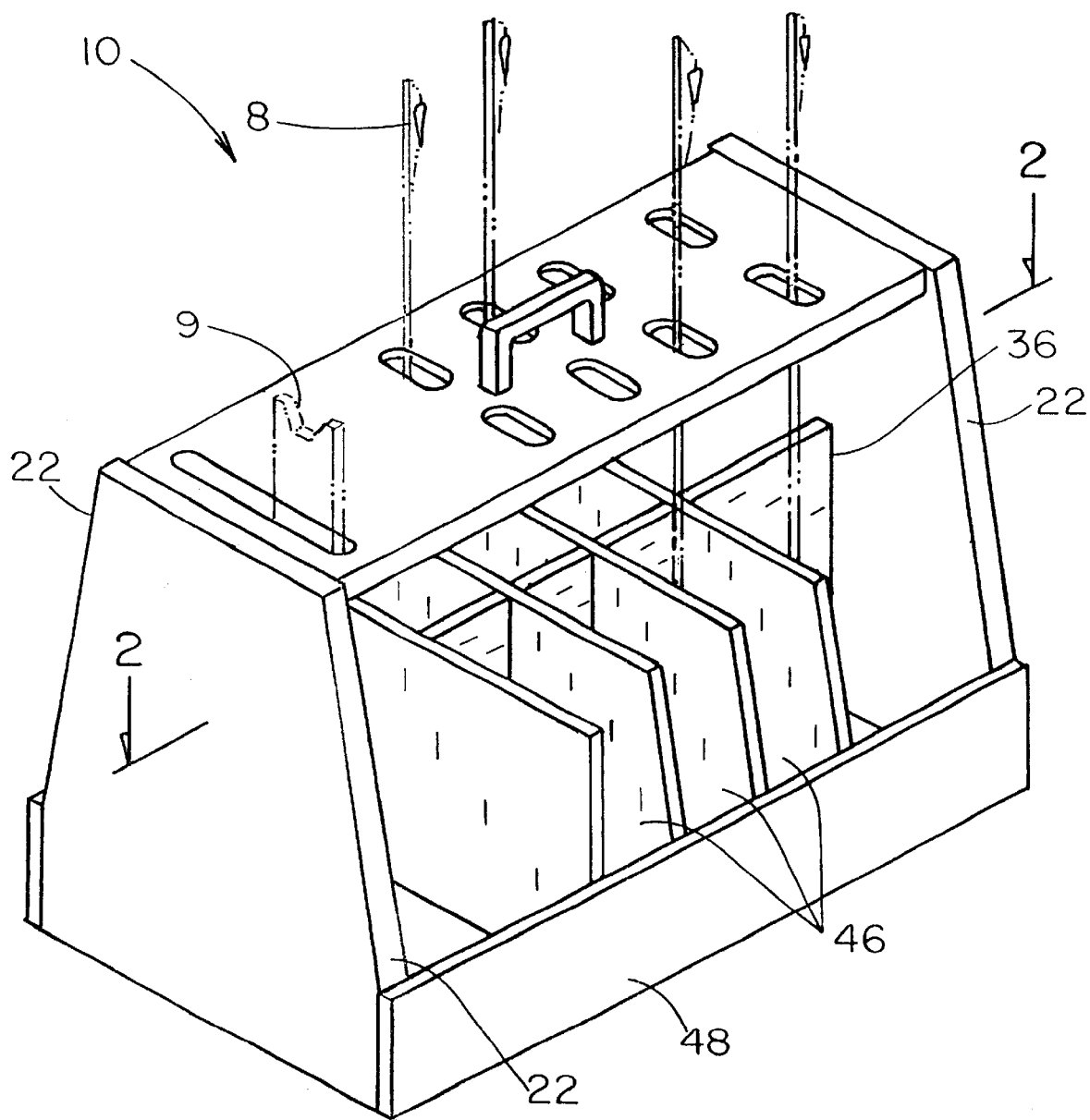
FIG. 1 is a schematic perspective view of a new ice fishing implement caddy according to the present invention.
Figure 2:
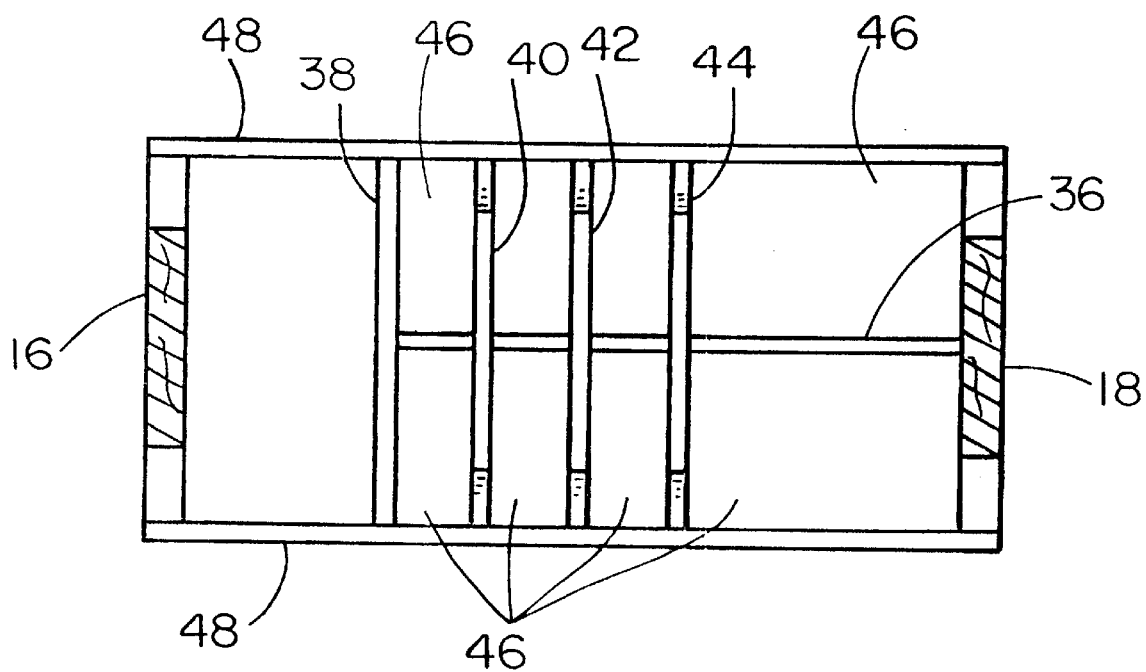
FIG. 2 is a schematic top cross-sectional view taken along line 2—2 of FIG. 1 of the present invention.

With reference now to the drawings, and in particular to FIGS. 1 through 4 thereof, a new ice fishing implement caddy embodying the principles and concepts of the present invention and generally designated by the reference numeral 10 will be described.

As best illustrated in FIGS. 1 through 4, the ice fishing implement caddy 10 generally comprises a device for holding a plurality of ice fishing implements including such devices as jigging rods 8 and ice-skimmers 9.

The device 10 includes a frame 12 having a bottom wall 14, a first end wall 16, a second end wall 18 and a top wall 20. Each of the end walls 16, 18 has angled side edges 22 such that the end walls 16, 18 taper inwardly from the bottom wall 14 toward the top wall 20. The top wall 20 has a plurality of openings 24 extending therethrough. The openings 24 comprise a first 26 and second 28 set of openings 24. The top 20 and bottom 14 walls each have a first side edge 30 and a second side edge 32. The first set 26 is positioned generally adjacent to the first side edge 30 of the top wall 20, and the second set 28 is positioned adjacent to the second side edge 32 of the top wall 20. The openings 24 each have an oblong shape such that each has a first width and a second width. The first widths are longer and are positioned along axis lines orientated perpendicular to a longitudinal axis of the top wall 20 extending through the end walls 16, 18. A slot 34 extends through the top wall 20 and is positioned generally adjacent to the first end wall 16. The slot 34 generally extends along the first end wall 16 such that the slot preferably has a length between 4 inches and 6 inches and a width equal to 1 inch. The top wall 20 preferably has a length between 18 inches and 20 inches and a width generally between 7 inches and 8 inches. The bottom wall 14 preferably has a length equal to a length of the top wall 20 and a width between 9 inches and 11 inches. The frame 12 has a height between 14 inches and 18 inches.

A dividing wall 36 is attached to and extends upwardly from the bottom wall 14. The dividing wall 36 is attached to the second end wall 18 and extends toward the first end wall 16. The dividing wall 36 is positioned between the first 30 and second 32 side edges of the bottom wall 14. The dividing wall 36 has a length substantially equal to 12 inches.

Each of a plurality of intermediate walls traverses the bottom wall 14 and extends between the first 30 and second 32 side edges of the bottom wall 14 such that compartments 46 are defined and bounded by adjacent intermediate walls, the dividing wall 36 and the second end wall 18. A first 38 of the intermediate walls is attached to a free end of the dividing wall. A second intermediate wall 40 extends through the dividing wall and is located generally 2 inches from the first intermediate wall 38. A third intermediate wall 42 extends through the dividing wall and is located generally 2 inches from the second intermediate wall 40. A fourth intermediate wall 44 extends through the dividing wall and is located generally 2 inches from the third intermediate wall 42. Each of the openings 24 is generally centrally located with respect to one of the compartments 46.

Each of a pair of lips 48 is coupled to and extends along one of the first 30 and second 32 side edges of the bottom wall 14. Each of the lips 48 extends upwardly and has a height generally between 3 inches and 5 inches. A handle 52 is attached to the top wall 20 and extends upwardly away therefrom.

In use, jigging rods 8 are extended through the openings 24 and spaced from each other in separate compartments 46. An ice skimmer 9 may be extended through the slot 34 and into an area between the first intermediate wall 38 and the first end wall 16. The are between the first intermediate wall 38 and the first end wall 16 may also be used for holding a thermos or other larger items often used while ice fishing. The remaining compartments 46 may be used for various other items needed for ice fishing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice-fishing caddy device for holding a plurality of ice fishing implements, said device comprising:

a frame having a bottom wall, a first end wall, a second end wall and a top wall, said top wall having a plurality of openings extending therethrough, a slot extending through said top wall and being positioned generally adjacent to said first end wall, said slot generally extending along said first end wall, said frame having a height generally between 14 inches and 18 inches;

a dividing wall being attached to and extending upwardly from said bottom wall, said dividing wall being attached to said second end wall and extending toward said first end wall;

a plurality of intermediate walls traversing said bottom wall and extending between a first side edge and a second edge of said bottom wall such that compartments are defined between adjacent intermediate walls and a portion of said intermediate walls extending through said dividing wall;

a pair of lips each being coupled to and extending along one of said first and second side edges of said bottom wall, each of said lips extending upwardly, and wherein said top wall having a length generally between 18 inches and 20 inches and a width generally between 7 inches and 8 inches, said bottom wall having a length generally equal to the length of said top wall and a width generally between 9 inches and 11 inches.

2. The ice-fishing caddy device as in claim 1, wherein said openings in said top wall comprise a first and second set of openings, each of said top and bottom walls having a first side edge and a second side edge, said first set being positioned generally adjacent to said first side edge of said top wall, said second set being positioned adjacent to said second edge of said top wall.

3. The ice-fishing caddy device as in claim 1, wherein said slot has a length between 4 inches and 6 inches and a width generally equal to 1 inch.

4. The ice-fishing caddy device as in claim 1, wherein said dividing wall is positioned between said first and second side edges of said bottom wall, said dividing wall having a length substantially equal to 12 inches, said bottom wall having a length generally between 18 inches and 20 inches, a first of said intermediate walls being attached to a free end of said dividing wall, a second intermediate wall extending through said dividing wall and being located generally 2 inches from said first intermediate wall, a third intermediate wall extending through said dividing wall and being located generally 2 inches from said second intermediate wall, a fourth intermediate wall extending through said dividing wall and being located generally 2 inches from said third intermediate wall, each of said openings being generally centrally located with respect one of said compartments.

5. The ice-fishing caddy device as in claim 4, further including:

a handle being attached to said top wall and extending upwardly away therefrom.

6. The ice-fishing caddy device as in claim 1, further including:

a handle being attached to said top wall and extending upwardly away therefrom.

7. An ice-fishing caddy device for holding a plurality of ice fishing implements, said device comprising:

a frame having a bottom wall, a first end wall, a second end wall and a top wall, each of said end walls having angled side edges such that said end walls taper inwardly from said bottom wall toward said top wall, said top wall having a plurality of openings extending therethrough, said openings comprising a first and second set of openings, each of said top and bottom walls having a first side edge and a second side edge, said first set being positioned generally adjacent to said first side edge of said top wall, said second set being positioned adjacent to said second edge of said top wall, a slot extending through said top wall and being positioned generally adjacent to said first end wall, said slot generally extending along said first end wall such that said slot has a length between 4 inches and 6 inches and a width generally equal to 1 inch, said top wall having a length generally between 18 inches and 20 inches and a width generally between 7 inches and 8 inches, said bottom wall having a length generally equal to a length of said top wall and a width generally between 9 inches and 11 inches, said frame having a height generally between 14 inches and 18 inches;

a dividing wall being attached to and extending upwardly from said bottom wall, said dividing wall being attached to said second end wall and extending toward said first end wall, said dividing wall being positioned between said first and second side edges of said bottom wall, said dividing wall having a length substantially equal to 12 inches;

a plurality of intermediate walls traversing said bottom wall and extending between said first and second edges of said bottom wall such that compartments are defined between adjacent intermediate walls, said dividing wall and said second end wall, a first of said intermediate walls being attached to a free end of said dividing wall, a second intermediate wall extending through said dividing wall and being located generally 2 inches from said first intermediate wall, a third intermediate wall extending through said dividing wall and being located generally 2 inches from said second intermediate wall, a fourth intermediate wall extending through said dividing wall and being located generally 2 inches from said third intermediate wall, each of said openings being generally centrally located with respect one of said compartments;

a pair of lips each being coupled to and extending along one of said first and second side edges of said bottom wall, each of said lips extending upwardly and having a height generally between 3 inches and 5 inches; and a handle being attached to said top wall and extending upwardly away therefrom.

* * * * *